(12) United States Patent
Miyagawa

(10) Patent No.: US 8,514,460 B2
(45) Date of Patent: Aug. 20, 2013

(54) IMAGE READER AND METHOD FOR ADJUSTING MAGNIFICATION ACCURACY OF IMAGE READER

(75) Inventor: Seiji Miyagawa, Osaka (JP)

(73) Assignee: KYOCERA Document Solutions Inc. (JP)

( * ) Notice: Subject to any disclaimer, the term of this patent is extended or adjusted under 35 U.S.C. 154(b) by 820 days.

(21) Appl. No.: 12/557,214

(22) Filed: Sep. 10, 2009

(65) Prior Publication Data

US 2010/0157380 A1    Jun. 24, 2010

(30) Foreign Application Priority Data

Dec. 22, 2008    (JP) .................................. 2008-326385

(51) Int. Cl.
*H04N 1/40* (2006.01)

(52) U.S. Cl.
USPC ....................................................... 358/448

(58) Field of Classification Search
None
See application file for complete search history.

(56) References Cited

U.S. PATENT DOCUMENTS

| | | | | |
|---|---|---|---|---|
| 6,611,292 B1 * | 8/2003 | Tsai et al. | ...................... | 348/345 |
| 2005/0265592 A1 * | 12/2005 | Asano et al. | .................. | 382/141 |
| 2008/0137980 A1 * | 6/2008 | Mizuno | ......................... | 382/255 |

FOREIGN PATENT DOCUMENTS

JP    09-023318    1/1997

* cited by examiner

*Primary Examiner* — Benny Q Tieu
*Assistant Examiner* — Sunil Chacko
(74) *Attorney, Agent, or Firm* — McDonnell Boehnen Hulbert & Berghoff LLP

(57) ABSTRACT

Reference patterns disposed on a platen unit are read by optically scanning the reference patterns and stored in an image memory as pattern image data. An interval between the reference patterns, the interval being stored in advance, is compared with intervals between read images of the reference patterns to calculate correction scaling factors for scaling the intervals between the read images. Document image data read by scanning a document placed on the platen unit is multiplied by the calculated correction scaling factors to adjust magnification accuracy of an image of the document.

14 Claims, 13 Drawing Sheets

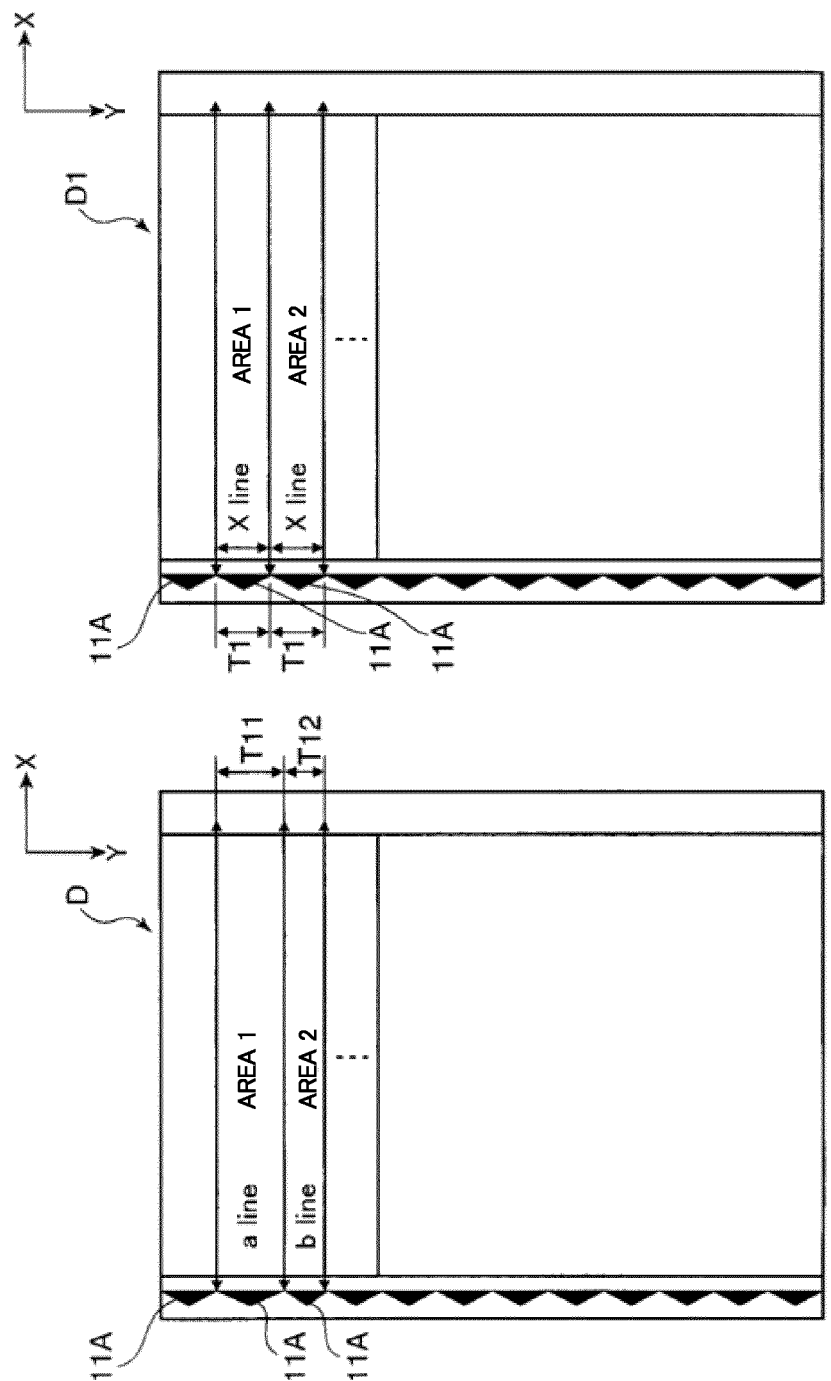

IMAGE READER AND METHOD FOR ADJUSTING MAGNIFICATION ACCURACY OF IMAGE READER

INCORPORATION BY REFERENCE

This application is based upon and claims the benefit of priority from the corresponding Japanese Patent application No. 2008-326385, filed Dec. 22, 2008, the entire contents of which are incorporated herein by reference.

BACKGROUND OF THE INVENTION

1. Field of the Invention

The present invention relates to an image reader that reads, by scanning a document placed on a document table, image data from the document and further relates to a corresponding method for adjusting the magnification accuracy.

2. Description of the Related Art

Image readers, such as facsimile machines, image scanners, and copying machines, are configured to read, by scanning a document placed on a document table, image data from the document.

Japanese Unexamined Patent Application Publication No. 9-23318 sets forth an image reader in which a document placed on a document table glass (hereinafter called a document table) reflects a beam emitted from a light source. Such a reflected beam reaches an imaging lens via a series of reflective mirrors. Then, the reflected beam, having reached the imaging lens, is imaged on the imaging surface of a charge-coupled device (CCD). As much as a line of a document can be obtained as image data through this processing.

The light source, reflective mirrors, imaging lens, and the CCD 106 are embedded in an optical unit. The optical unit is placed on two scanning rails. The scanning rails are disposed in parallel with the document mounting surface of the document table and in the sub-scanning direction of a document. The optical unit moves on the scanning rails using a drive unit as a drive source. A motor is embedded in the drive unit.

In such an image reader, the optical unit repeats the aforementioned processing by moving on the scanning rails to obtain the image data corresponding to a page of a document. In this type of image reader, the image data may deteriorate due to the mechanical precision of a read scanning system that includes the optical unit, scanning rails, drive unit, and the like. Phenomena that cause a deterioration of the image data due to the mechanical precision of the read scanning system will next be described.

It is assumed that the optical unit moves on the scanning rails at constant speed. However, the movement speed of the optical unit may partially vary due to, for example, the presence of deformations such as projections and depressions in the scanning rails or a fluctuation of motor rotational speed.

When the movement speed of the optical unit varies while the optical unit is moving on the scanning rails, an error of distance in the sub-scanning direction with respect to a document occurs in the image data obtained during the period. That is, the magnification accuracy in the sub-scanning direction with respect to a document decreases.

Another assumption is that the reflective mirrors in the optical unit have mirror surfaces that are even. However, a curvature may occur in the mirror surface of any of the reflective mirrors. When any of the reflective mirrors has a portion where a curvature has occurred, a reflected beam is scattered at the curvature. As a result, an error of distance in the main scanning direction with respect to a document occurs in the image data, since a portion of the reflected beam is scattered.

That is, the magnification accuracy in the main scanning direction with respect to a document decreases.

Typically, the mechanical precision of the optical unit has been adjusted during manufacture or shipment of an image reader, so as to prevent the occurrence of such deterioration of the image data. This has included performing operations such as repairing the deformation of the scanning rails, embedding a high-performance motor having a constant rotational speed, and evening the mirror surface of each of the reflective mirrors repairing the curvature of the mirror surface.

However, such operations increase the manufacturing costs for manufacturing image readers, due to additional labor and expensive parts.

SUMMARY OF THE INVENTION

In view of the aforementioned problems, it is an object of the present invention to provide an image reader that can adjust the magnification accuracy at low cost and a method for adjusting the magnification accuracy which does not require adjusting the mechanical precision during manufacture or shipment.

An image reader according to a first aspect of the present invention includes a platen unit that includes a document area where a document is placed and a reference pattern area on an outer side of the document area, having reference patterns drawn in a sub-scanning direction at predetermined intervals. The image reader further includes a scanner that optically scans the document area and the reference pattern area, using a scanning unit that includes a light source and a reflective mirrors, and forms an image on an imaging device via a lens. An image data generation unit in the image reader generates image data from an electrical signal converted by the imaging device and stores the image data in an image memory. A drive unit reciprocates the scanning unit in the sub-scanning direction and an image processing unit performs predetermined image processing on the image data stored in the image memory. A scaling factor calculation unit calculates correction scaling factors for the read images in the sub-scanning direction by comparing the interval of the reference patterns, the interval being stored in advance, with a corresponding interval of the read images of the reference patterns. A control unit uses the correction scaling factors to perform a magnification accuracy adjustment during or after the reading of the document image.

Moreover, the control unit preferably adjusts the magnification accuracy in the sub-scanning direction by multiplying the read document image data by the correction scaling factors.

Moreover, a pair of groups of the reference patterns is preferably disposed on both sides of the document area. The scaling factor calculation unit preferably calculates correction scaling factors of the read images in the main scanning direction by comparing an interval in a main scanning direction between the pair of groups of the reference patterns, the interval being stored in advance, with intervals in the main scanning direction between read images of the pair of the groups of the reference patterns. This comparison is used to calculate correction scaling factors for scaling the intervals between the read images in the main scanning direction. The control unit preferably adjusts the magnification accuracy of a document image in the main scanning direction by multiplying the read image data of the document image by the correction scaling factors.

Moreover, the image reader according to the first aspect of the present invention preferably further includes a scanning speed adjustment unit that adjusts movement speed of the scanning unit, by using the drive unit. When a document is read, the control unit preferably adjusts magnification accuracy of the read image of the document by changing the movement speed of the scanning unit during each of the intervals, using the scanning speed adjustment unit, on the basis of a correction scaling factor for each of the intervals calculated by the scaling factor calculation unit.

Moreover, an image forming apparatus preferably includes the aforementioned image reader.

A method according to a second aspect of the present invention for adjusting magnification accuracy includes first reading reference patterns disposed on a platen unit by optically scanning the reference patterns and storing read images of the reference patterns as image data in an image memory. Then, correction scaling factors of the read images in the sub-scanning direction are calculating by comparing an interval between the reference patterns, the interval being stored in advance, with intervals between read images of the reference patterns to calculate correction scaling factors for scaling the intervals between the read images in a sub-scanning direction. Next, a document placed on the platen unit is read by scanning the document and adjusting magnification accuracy of an image of the document by multiplying the image data of the image of the read document by the correction scaling factors.

Moreover, pairs of reference patterns disposed on both sides of the platen unit are preferably read. Intervals in a main scanning direction between the pairs of reference patterns are preferably compared with intervals in the main scanning direction between read images of the pairs of reference patterns to calculate correction scaling factors in the main scanning direction. The magnification accuracy in the main scanning direction is preferably adjusted using the correction scaling factors.

A method according to a third aspect of the present invention for adjusting magnification accuracy includes reading reference patterns disposed on a platen unit by optically scanning the reference patterns and storing the reference patterns as pattern image data in an image memory, comparing an interval between the reference patterns, the interval being stored in advance, with intervals between read images of the reference patterns to calculate correction scaling factors for scaling the intervals between the read images in a sub-scanning direction, and reading an image of a document placed on the platen unit while changing the read scanning speed on the basis of the correction scaling factors.

According to the present invention, the magnification accuracy in the main scanning direction or the sub-scanning direction can be adjusted by a control operation even without adjusting the mechanical precision, for example, adjusting the angle of the mirror surface. Thus, the magnification accuracy in the main scanning direction or the sub-scanning direction can be adjusted at low cost.

Additional features and advantages are described herein, and will be apparent from the following Detailed Description and the figures.

BRIEF DESCRIPTION OF THE DRAWINGS

FIGS. 5A and 5B show the procedure for calculating an image scaling factor for scaling an image area in the sub-scanning direction;

DESCRIPTION OF THE PREFERRED EMBODIMENTS

Figure 1:
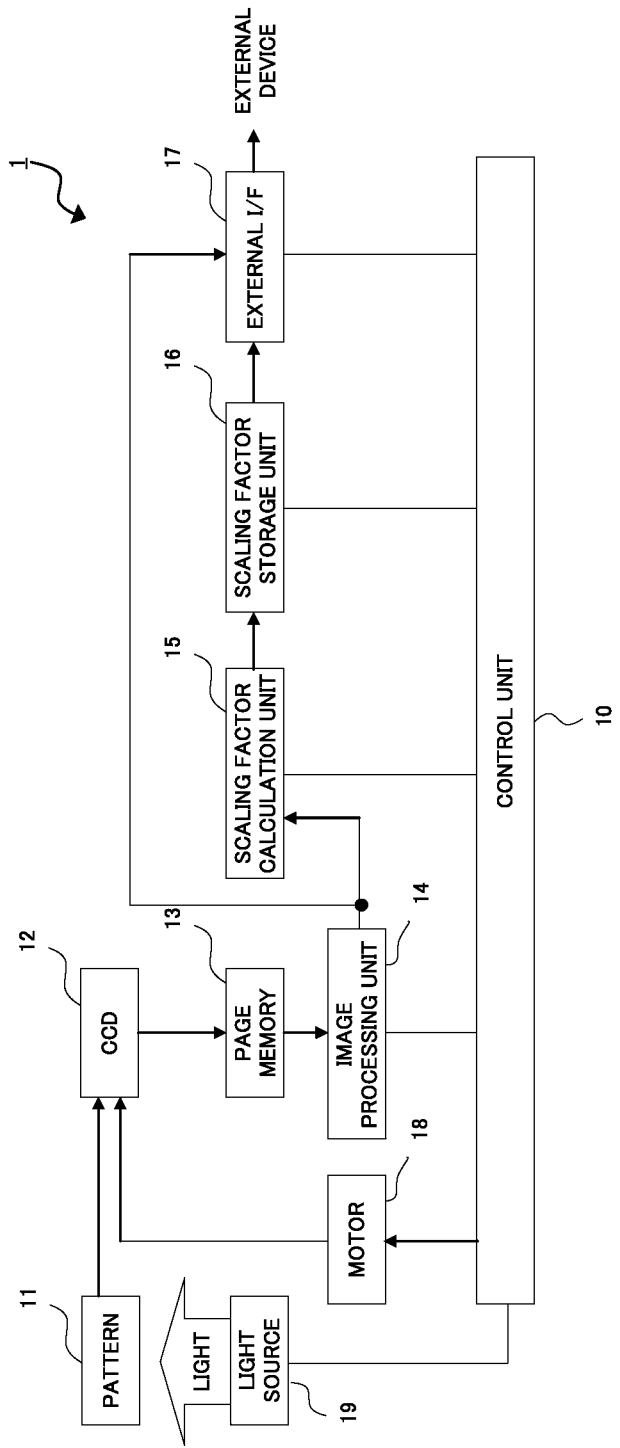
FIG. 1 shows exemplary functional components of an image reader according to an embodiment of the present invention.

An image reader according to an embodiment of the present invention will now be described. FIG. 1 shows exemplary functional components of the image reader according to one embodiment of the present invention.

The image reader 1 includes a control unit (control means) 10, a pattern (a reference pattern) 11, a charge-coupled device (CCD) 12, a page memory (an image memory) 13, an image processing unit (image processing means) 14, a scaling factor calculation unit (scaling factor calculation means) 15, a scaling factor storage unit (scaling factor storage means) 16, an external interface (I/F) 17, a motor (drive means) 18, and a light source 19.

The control unit 10 includes a central processing unit (CPU) and the like and controls the image reader 1 by transferring control signals and data via a control bus (for example, a CPU bus) and a data bus. The control unit 10 has an image scaling factor setting function, an image data scaling function, a scanning speed shifting factor setting function, and a scanning speed shifting function.

Figure 3:
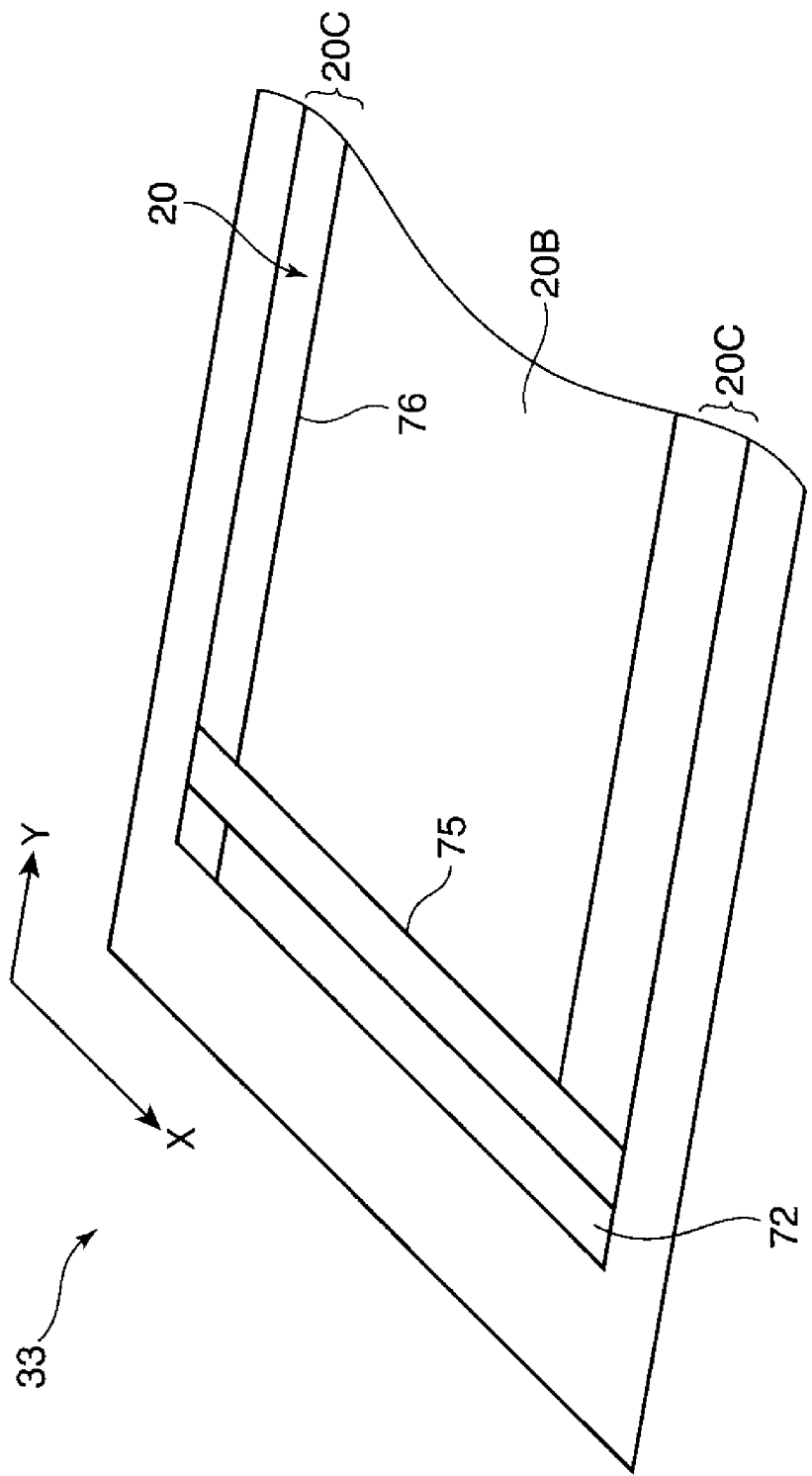
FIG. 3 is a perspective view showing an exemplary appearance of a scanner section, as view from the top.
Figure 4:
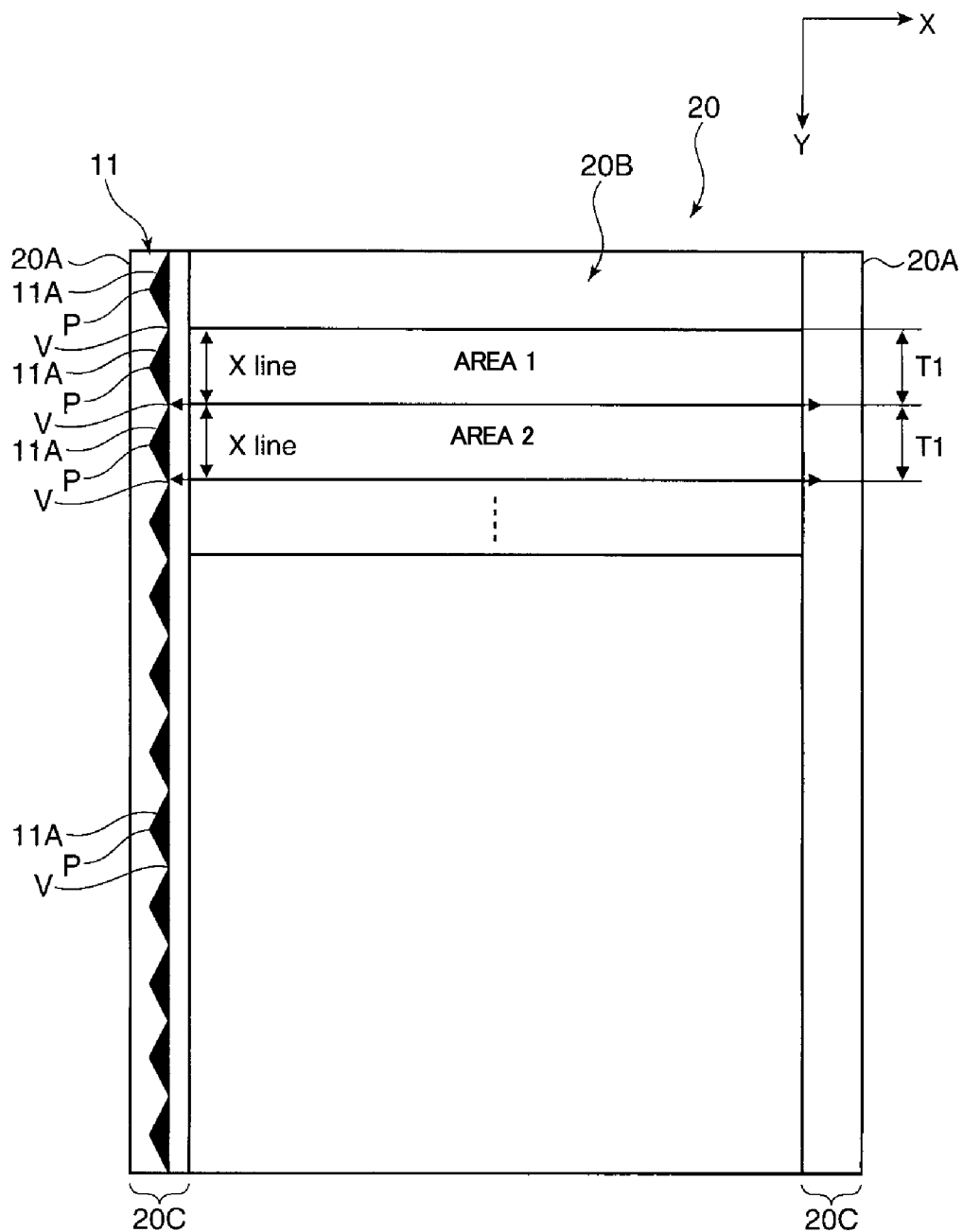
FIG. 4 shows an exemplary arrangement of a document table.

The pattern 11 is drawn in a first area of a document table (platen unit) 20 shown in FIGS. 3 and 4 outside of a document mounting area 20B where a document is placed. The first area is irradiated with a beam from the light source 19. For example, as shown in FIG. 4, a plurality of reference objects 11A are drawn along a line in the sub-scanning direction (in FIGS. 3 and 4, the Y-axis direction) at predetermined intervals (reference intervals) T1. This line can be on either of the edges 20C of the main scanning direction of the document table (platen unit) 20 (in FIGS. 3 and 4, the X-axis direction).

The light source 19 emits a beam onto the document table (platen unit) 20. This beam is reflected off the document table (platen unit) 20 and is received by the CCD 12, which generates corresponding image data, e.g., image data corresponding to a page. The page memory 13 stores the image data generated by the CCD 12. The CCD 12, a scanning unit 53, a mirror unit 54, and an imaging lens 55 (described below) constitute image data generation means.

The image processing unit 14 performs image processing on the image data stored in the page memory 13. The processing includes shading, masking, gamma correction, edge enhancement, smoothing, and color conversion, for example. In addition, the image processing unit 14 scales the image data in the sub-scanning direction (the Y-axis direction in FIGS. 3 and 4) or the main scanning direction (the X-axis direction in FIGS. 3 and 4), as described below.

The scaling factor calculation unit 15 calculates an image scaling factor on the basis of image data of the pattern 11. The calculation processing by the scaling factor calculation unit 15 will be described below. The scaling factor storage unit 16 stores the image scaling factor calculated by the scaling factor calculation unit 15. The storage processing by the scaling factor storage unit 16 will be described below.

The external I/F (interface) 17 outputs image data having been subjected to image processing to an external device via a transmission line, a communication network, and the like. The motor 18 moves the CCD 12 in the sub-scanning direction. The light source 19 emits a beam onto the document table (platen unit) 20, causing the CCD 12 to receive the reflected beam so as to generate image data.

Figure 2:
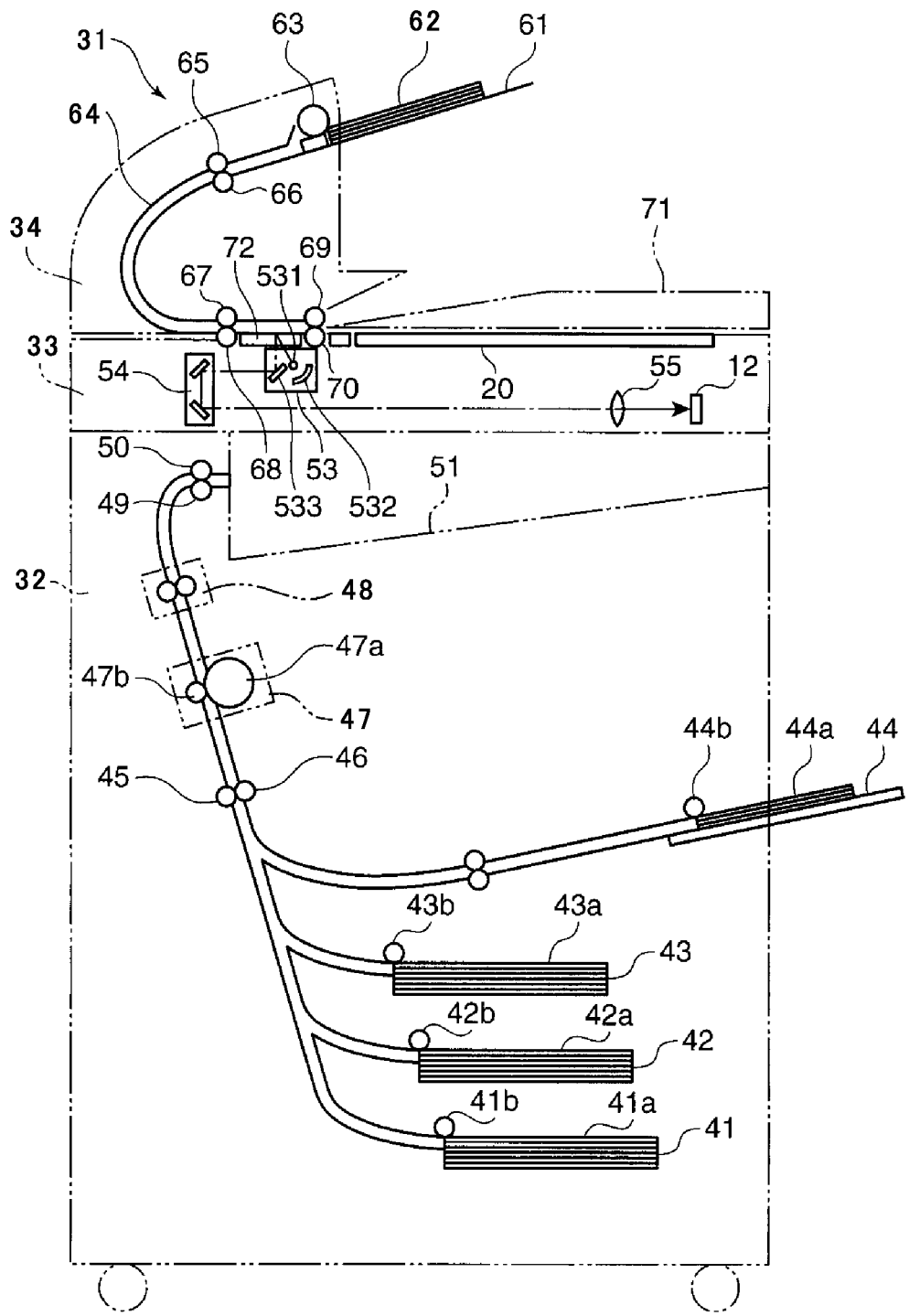
FIG. 2 is a longitudinal sectional view showing mechanical components of a copying machine in which the image reader according to the embodiment of the present invention is embedded.

FIG. 2 is a longitudinal sectional view showing mechanical components of a copying machine in which the image reader according to the embodiment of the present invention is embedded. Generally, the copying machine 31 includes a main body section 32, a scanner section 33 (the image reader) disposed on the upper side of the main body section 32, and an automatic document feeder (ADF) 34 disposed on the upper side of the scanner section 33.

In the main body section 32, sheets from one of the stacks of recording sheets 41a, 42a, 43a, and 44a set in a plurality of trays 41, 42, and 43 and a manual feed tray 44 are picked up one by one, using a corresponding one of pick-up rollers 41b, 42b, 43b, and 44b. The picked-up recording sheet is conveyed to an image forming unit 47 after timing is adjusted in resist rollers 45 and 46. In the image forming unit 47, a charger, a laser writing unit, and a developer that are not shown, a transfer unit 47b, a cleaning unit that is not shown, and the like are disposed around a photosensitive drum 47a, and an image is formed on the recording sheet by electrophotography. A toner image formed on the recording sheet in this manner is fused into place in a fuser 48, and then the recording sheet is output to an output tray 51 from exit rollers 49 and 50.

The scanner section 33 reads image data to be transferred to the laser writing unit. The scanner section 33 includes the scanning unit 53, which irradiates a document with illumination light through the document table (platen unit) 20 and receives the reflected light, the mirror unit 54, which reflects a document image obtained in the scanning unit 53, the imaging lens 55, which converges the document image from the mirror unit 54, and the CCD 12, which performs photoelectric conversion on the document image imaged by the imaging lens 55. In the present embodiment, the CCD 12, the scanning unit 53, the mirror unit 54, and the imaging lens 55 constitute image data generation means. These parts of the scanner section 33 are located under the document table (platen unit) 20, which is formed of a transparent plate such as a glass plate.

The scanning unit 53 is driven in the sub-scanning direction by, for example, a stepping motor (not shown). A document to be imaged, such as a book, a sheet of paper, or the like, is placed on the document table (platen unit) 20. The CCD 12 images the document using a constant optical path length caused by displacing the scanning unit 53 at a speed of V and the mirror unit 54 at a speed of V/2 in the horizontal direction in FIG. 2, i.e., in the sub-scanning direction.

The ADF 34 takes in sheet documents 62 one by one from a document tray 61 using a pick-up roller 63. Each sheet is transferred to a curved carrying path 64 and carried (by carrying rollers 65, 66, 67, and 68) to a reading window 72 that extends in the main scanning direction and is formed of a transparent plate such as a glass plate. The scanning unit 53 faces the reading window 72 and reads the document images one by one. The documents 62 are then output to an output tray 71 by exit rollers 69 and 70.

The scanning unit 53 includes a cold-cathode tube 531 (a light source), a reflective plate 532 that reflects light emitted from the cold-cathode tube 531 toward the document table (platen unit) 20 and the reading window 72, and a mirror 533 that reflects, to the mirror unit 54, reflected light obtained from a document through the document table (platen unit) 20, the reading window 72, and the like. Moreover, the cold-cathode tube 531, the reflective plate 532, the mirror 533, the mirror unit 54, the imaging lens 55, and the CCD 12 extend longer than the respective widths of the document table (platen unit) 20 and the reading window 72 in the main scanning direction.

FIG. 3 is a perspective view showing an exemplary appearance of the scanner section 33, as viewed from the top. The document table (platen unit) 20 and the reading window 72 are disposed on the upper surface of the scanner section 33, as shown in FIG. 3. A document stopper 75 is provided between the document table (platen unit) 20 and the reading window 72. Moreover, a document stopper 76 is provided on a side, adjacent to the document stopper 75, of the document table (platen unit) 20. A document is positioned with reference to an index of document size, using the document stoppers 75 and 76. In this case, the inner edge of the document stopper 75 indicates the position of an end of a document in the sub-scanning direction.

In the scanner section 33, the pattern 11, in which the reference objects 11A are drawn in the sub-scanning direction at predetermined intervals, is drawn on one of the pair of edges 20C of the document table (platen unit) 20, the edges 20C sandwiching the document mounting area 20B where a document is placed. The pattern 11 will next be described in detail.

FIG. 4 shows an exemplary arrangement of the document table (platen unit) 20. In FIG. 4, the pattern 11, in which the reference objects 11A are drawn in the sub-scanning direction (in FIG. 4, the Y-axis direction) at the predetermined intervals T1, is drawn on the backside of the document table (platen unit) 20, as described above.

In the pattern 11, a plurality of triangle figures are drawn as the reference objects 11A in series in the sub-scanning direction (in FIG. 4, the Y-axis direction) in a state in which the triangle figures are in contact with each other at respective ones of their vertices. Moreover, an apex P of each of the triangle figures is directed outwards in the main scanning direction of the document table (platen unit) 20 (in FIG. 4, the X-axis direction). Moreover, the interval between a first valley V formed by adjacent triangle figures and a second valley V adjacent to the first valley V is set as the aforementioned predetermined interval (reference interval) T1.

The pattern 11 exists on an area outside of the document mounting area 20B where a document is placed, i.e., one of the pair of edges 20C existing on both sides of the document mounting area 20B in the main scanning direction in the document table (platen unit) 20. This area is irradiated with a beam from the light source 19.

In such an image reader 1, the magnification accuracy in the sub-scanning direction is adjusted by using the image data including the image of the pattern 11. The image data is read by the CCD 12 and subjected to image processing. The control unit 10 controls operations of adjusting the magnification accuracy in the sub-scanning direction, as described below
[Operations of Adjusting Magnification Accuracy in Sub-Scanning Direction]

Image data including the image of the pattern 11 is inputted to the scaling factor calculation unit 15. The scaling factor calculation unit 15 performs the following processing, using the image data including the image of the pattern 11.

The scaling factor calculation unit 15 calculates an image scaling factor (a correction scaling factor) for scaling an image area in the sub-scanning direction, the image area being separated by the interval in the sub-scanning direction between adjacent ones of the reference objects 11A, so that the interval in the sub-scanning direction between adjacent ones of the reference objects 11A drawn in the pattern 11 (hereinafter called an actual interval) is equal to the interval in the sub-scanning direction between adjacent ones of the reference objects 11A represented by the image data. FIGS. 5A and 5B show the procedure for calculating an image scaling factor for scaling an image area in the sub-scanning direction. FIG. 5A shows the image data having not been scaled in the sub-scanning direction and FIG. 5B shows the image data having been scaled in the sub-scanning direction for correction, respectively.
[Procedure for Calculating Image Scaling Factor for Scaling in Sub-Scanning Direction (1)]

The following processing is performed by the image scaling factor setting function of the control unit 10. It is assumed that the actual interval in the sub-scanning direction between adjacent ones of the reference objects 11A drawn in the pattern 11 is a line number represented as X [line]. Line number X represents the reference interval T1 by the number of scanning lines in the sub-scanning direction (sub-scanning read resolution).

When image data D including the image of the pattern 11 is inputted, the scaling factor calculation unit 15 detects, for each line (scanning line), the width of a corresponding one of the reference objects 11A in the main scanning direction (in FIG. 3, the X-axis direction) in the image data D to detect a point at which the width stops decreasing and starts increasing. Such a point is the valley V formed by adjacent ones of the reference objects 11A.

Then, the scaling factor calculation unit 15 determines the interval between the adjacent valleys V by counting the number of the aforementioned scanning lines. The number of lines counted in this manner represents the interval in the sub-scanning direction between adjacent ones of the reference objects 11A.

Then, the scaling factor calculation unit 15 separates the image data D by the interval in the sub-scanning direction between adjacent ones of the reference objects 11A to obtain a plurality of image areas.

Specifically, a plurality of image areas (area 1, area 2, . . . ), as shown in FIG. 5A, each indicate the interval in the sub-scanning direction between adjacent ones of the reference objects 11A. The image areas are parsed at every definite number of lines (line number a, line number b, . . . ) in the image data D.

Then, for each of the image areas, the scaling factor calculation unit 15 compares the number of lines indicating the interval in the sub-scanning direction between adjacent ones of the reference objects 11A with the actual interval (line number X) in the sub-scanning direction between adjacent ones of the reference objects 11A drawn in the pattern 11. The scaling factor calculation unit 15 then calculates an image scaling factor for scaling the image area in the sub-scanning direction so that the actual interval (line number X) in the sub-scanning direction between adjacent ones of the reference objects 11A drawn in the pattern 11 is equal to the number of lines (a, b, . . . ) indicating the interval in the sub-scanning direction between adjacent ones of the reference objects 11A represented by the image data D.

Specifically, when the number of lines in the sub-scanning direction in the image area 1 is "a", as shown in FIG. 5A, X/a is calculated as an image scaling factor. Moreover, when the number of lines in the sub-scanning direction in the image area 2 is "b", X/b is calculated as an image scaling factor.

Image data D1 shown in FIG. 5B can be obtained by scaling the image area 1 and the image area 2 in the sub-scanning direction according to the respective image scaling factors. In the image data D1, the number of lines indicating the interval in the sub-scanning direction between adjacent ones of the reference objects 11A is X in both the image area 1 and the image area 2.

The image scaling factor calculated in this manner is stored in the scaling factor storage unit 16 for each image area.
[Procedure for Calculating Image Scaling Factor for Scaling in Sub-Scanning Direction (2)]

The procedure for calculating an image scaling factor for scaling in the sub-scanning direction using the scanning speed shifting factor setting function of the control unit 10 is similar to the aforementioned procedure for calculating an image scaling factor using the image scaling factor setting function.

In this case, a scanning speed in the sub-scanning direction represents a speed at which the document table (platen unit) 20 is scanned in the sub-scanning direction by moving the scanning unit 53 in the sub-scanning direction. Such scanning speed is uniquely determined by a drive frequency supplied to the motor 18.

Specifically, when the number of lines in the sub-scanning direction in the image area 1 is "a", as shown in FIG. 5A, a/X is calculated as a scanning speed shifting factor (a correction scaling factor). Moreover, when the number of lines in the sub-scanning direction in the image area 2 is "b", b/X is calculated as a scanning speed shifting factor.

The image data D1 shown in FIG. 5B can be obtained by changing the scanning speed according to the scanning speed shifting factors when the scanning unit 53 is caused to scan the image area 1 and the image area 2. In the image data D1, the number of lines indicating the interval in the sub-scanning direction between adjacent ones of the reference objects 11A is X in both the image area 1 and the image area 2.

The scanning speed shifting factor calculated in this manner is stored in the scaling factor storage unit 16 for each image area (the area 1, the area 2, . . . ).

For example, the interval between the respective apexes P of adjacent triangles or the interval between the apex P of a triangle and the valley V nearest to the apex P may be set as the aforementioned predetermined interval T1. In particular, when the interval between the apex P of a triangle and the valley V nearest to the apex P is set as the predetermined interval T1, the number of image areas increases, and thus the magnification accuracy in the sub-scanning direction can be finely adjusted.

Figure 6A:
FIGS. 6A and 6B show how image scaling factors and scanning speed shifting factors are stored in a scaling factor storage unit.
Figure 6B:

FIGS. 6A and 6B show how image scaling factors and scanning speed shifting factors are stored in the scaling factor storage unit 16. FIG. 6A shows an example in which image scaling factors calculated through the above Procedure for Calculating Image Scaling Factor for Scaling in Sub-Scanning Direction (1) are stored. FIG. 6B shows an example in which scanning speed shifting factors calculated through the above Procedure for Calculating Image Scaling Factor for Scaling in Sub-Scanning Direction (2) are stored.

In the scaling factor storage unit 16 shown in FIG. 6A, an image scaling factor (in this case, set as "scaling factor in sub-scanning direction") is stored for each image area (the area 1, the area 2, . . . ). Specifically, the image scaling factor (correction scaling factor) X/a is stored for image area 1 and the image scaling factor X/b is stored for image area 2.

On the other hand, in the scaling factor storage unit 16 shown in FIG. 6B, a scanning speed shifting factor (in this case, set as "scaling factor of scanning speed") is stored for each image area. Specifically, the scanning speed shifting factor (correction scaling factor) a/X is stored for image area 1 and the scanning speed shifting factor b/X is stored for image area 2.

When adjustment of the magnification accuracy in the sub-scanning direction exemplified below is performed, image scaling factors stored in the scaling factor storage unit 16 (refer to FIG. 6A) and scanning speed shifting factors stored in the scaling factor storage unit 16 (refer to FIG. 6B) are used. Adjustment of the magnification accuracy in the sub-scanning direction includes two types of adjustment of the magnification accuracy, as described in the following paragraphs.

[Adjustment of Magnification Accuracy in Sub-Scanning Direction (1)]

When the image data of a document is generated by the CCD 12, the image processing unit 14 accepts input of the generated image data of the document.

In this case, the accepted image data of the document includes the image data of the pattern 11. This is because the pattern 11 is also irradiated with a beam from the light source 19, and the CCD 12 receives a beam reflected at the pattern 11. Thus, the image processing unit 14 removes pixels corresponding to the pair of edges 20C of the document table (platen unit) 20 from the accepted image data of the document. The image data of only the document is obtained by this operation.

When the image data of only the document is obtained in this manner, the image processing unit 14 reads the image scaling factor of each image area (the area 1, the area 2, . . . ) from the scaling factor storage unit 16 shown in FIG. 6A. Then, the image data of only the document is scaled for each image area according to an image scaling factor corresponding to the image area.

Specifically, out of the image data, the image area 1 is scaled by a factor of X/a in the sub-scanning direction, and the image area 2 is scaled by a factor of X/b in the sub-scanning direction. The magnification accuracy in the sub-scanning direction is improved by such adjustment of the magnification accuracy.

[Adjustment of Magnification Accuracy in Sub-Scanning Direction (2)]

When the control unit 10 moves the scanning unit 53 in the sub-scanning direction, using the motor 18, the control unit 10 reads the scanning speed shifting factor of each image area (the area 1, the area 2, . . . ) from the scaling factor storage unit 16 shown in FIG. 6B. Then, the document table (platen unit) 20 is scanned while the scanning speed of the scanning unit 53 is changed according to a scanning speed shifting factor corresponding to each image area.

Specifically, for the image area 1, the scanning speed is multiplied by a/X, and for the image area 2, the scanning speed is multiplied by b/X. The magnification accuracy in the sub-scanning direction is improved by such adjustment of the magnification accuracy.

In this case, in a manner similar to that described above, the image processing unit 14 removes pixels corresponding to the pair of edges 20C of the document table (platen unit) 20 from image data obtained by the CCD 12 as a result of scanning. The image data of only a document is obtained by this operation.

Figure 7:
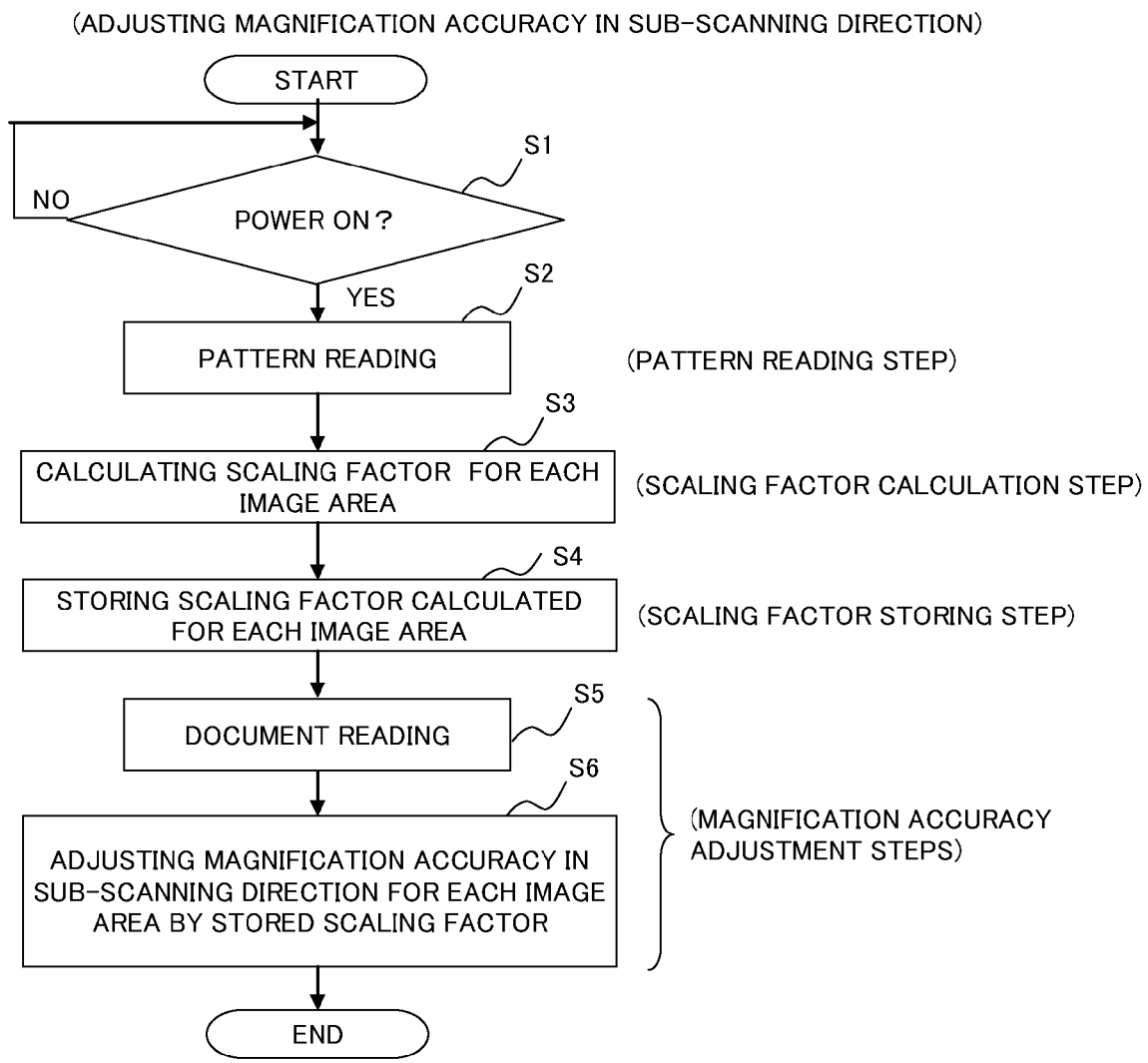
FIG. 7 is flowchart showing exemplary methods according to an embodiment of the present invention for adjusting the magnification accuracy.

FIG. 7 is flowchart showing exemplary methods for adjusting the magnification accuracy in the sub-scanning direction, according to an embodiment of the present invention. Such methods for adjusting the magnification accuracy include the following two methods.

[Method 1 for Adjusting Magnification Accuracy in Sub-Scanning Direction]

In the image reader 1, when it is determined in step S1 that the power has been turned on, in step S2 (a pattern reading step), the scanning unit 53 scans the pattern 11, and the CCD 12 generates image data that includes an image of the pattern 11.

Then, after a scaling factor calculation step and a scaling factor storage step (described below) are performed, the following magnification accuracy adjustment steps are performed.

Specifically, in step S3 (the scaling factor calculation step), for each image area (the area 1, the area 2, . . . ), the scaling factor calculation unit 15 calculates an image scaling factor such that the interval in the sub-scanning direction between adjacent ones of the reference objects 11A drawn in the pattern 11 is equal to the interval in the sub-scanning direction between adjacent ones of the reference objects 11A represented by the image data.

Then, in step S4 (the scaling factor storage step), the scaling factor storage unit 16 stores the image scaling factor calculated for each image area.

Then, when it is determined in step S5 that the image data of a document has been generated, in step S6, the control unit 10 causes the image processing unit 14 to scale the image data of the document in the sub-scanning direction for each image area (the area 1, the area 2, . . . ) according to an image scaling factor stored in association with the image area in the scaling factor storage unit 16 (steps S5 and S6; the magnification accuracy adjustment steps).

[Method 2 for Adjusting Magnification Accuracy in Sub-Scanning Direction]

Steps S1 through S4 are performed similarly in methods and 2. Then, when the control unit 10 moves the scanning unit 53 in the sub-scanning direction in step S5, using the motor 18, in step S6, the control unit 10 changes the movement speed of the scanning unit 53 for each image area (the area 1, the area 2, . . . ) according to a corresponding scanning speed shifting factor stored in the scaling factor storage unit 16 (steps S5 and S6; the magnification accuracy adjustment steps).

Figure 8:
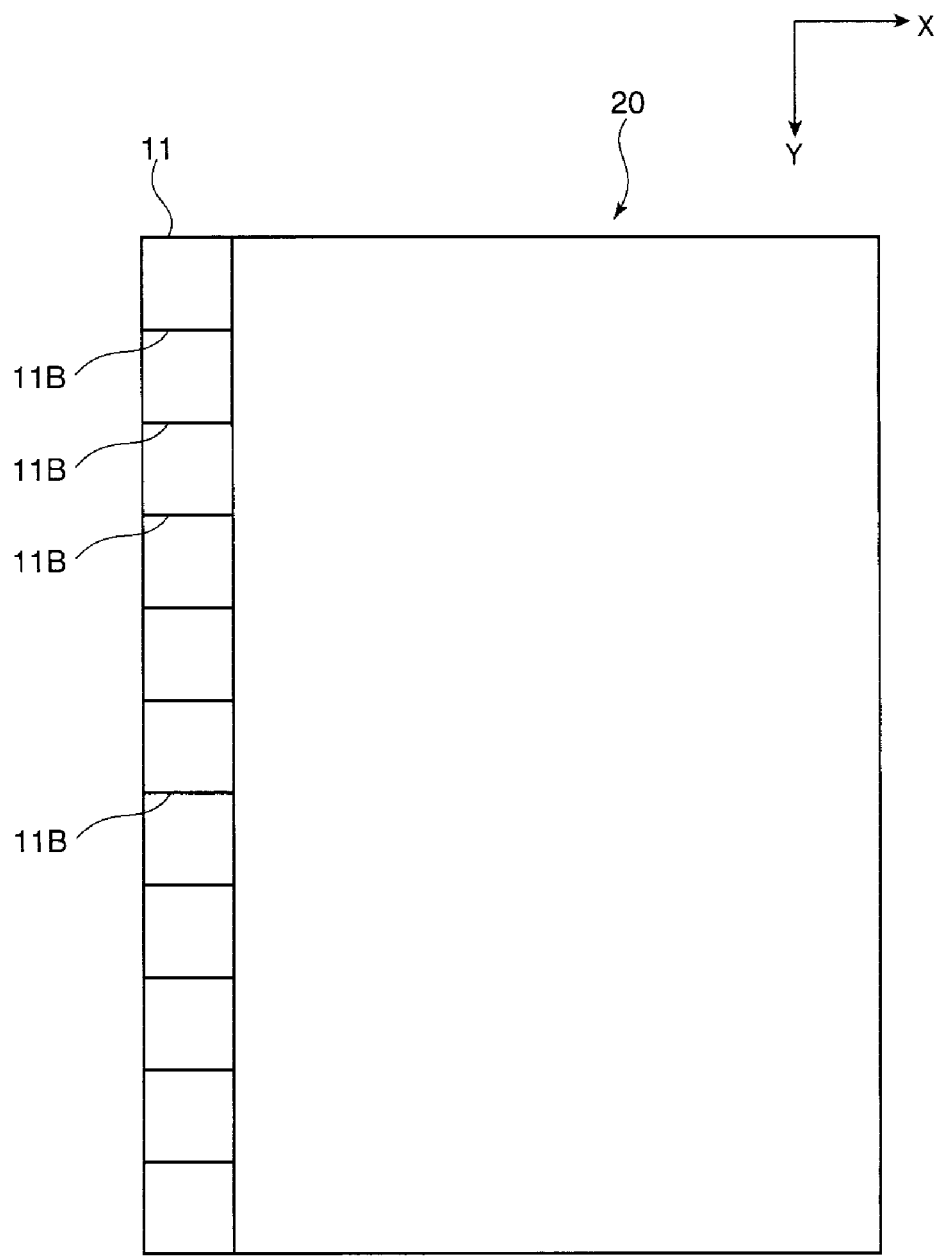
FIG. 8 shows another exemplary arrangement of a pattern.

In this case, the image reader 1 can also perform the aforementioned adjustment of the magnification accuracy in the sub-scanning direction, using the pattern 11, in which linear objects 11B directed in the main scanning direction (in FIG. 8, the X-axis direction) are drawn at even intervals, as a reference image, as shown in FIG. 8.

Moreover, other figures may be used. For example, figures that have clear density difference and are drawn in the sub-scanning direction at even intervals may be used.

Figure 9:
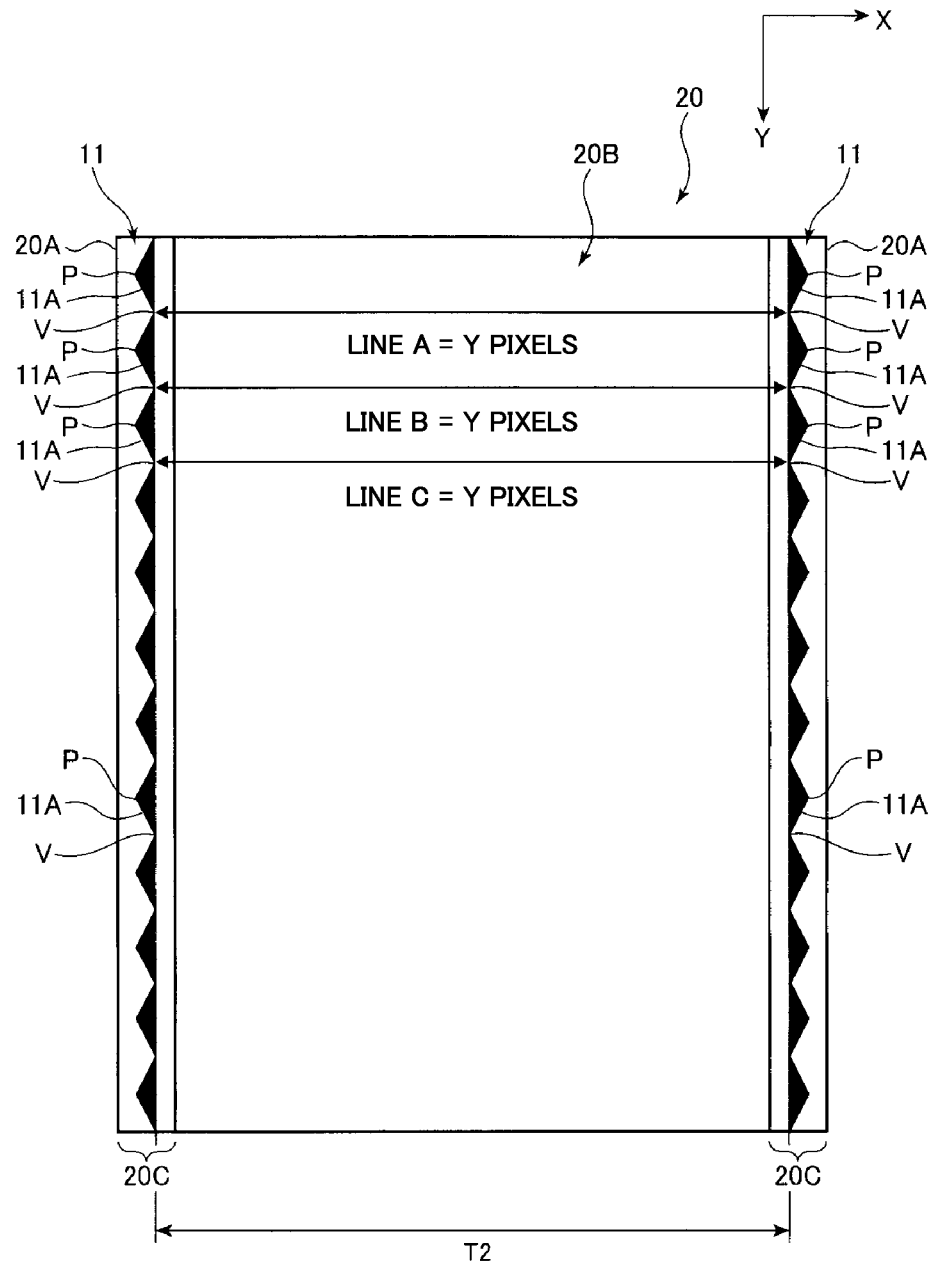
FIG. 9 shows another exemplary arrangement of the document table.

FIG. 9 shows another exemplary arrangement of the document table where a document is placed. In FIG. 9, a pair of the patterns 11, in which the reference objects 11A are drawn in the sub-scanning direction (in FIG. 9, the Y-axis direction), exists on the backside of the document table (platen unit) 20.

The patterns 11 exist on a pair of areas that are irradiated with a beam from the light source 19 and are separated from each other in the main scanning direction (in FIG. 9, the X-axis direction), the areas sandwiching the document mounting area 20B, i.e., the pair of edges 20C existing on both sides of the document mounting area 20B in the main scanning direction in the document table (platen unit) 20.

In such an image reader 1, operations of adjusting the magnification accuracy in the main scanning direction are performed using image data including the images of the pair of patterns 11. Operations of adjusting the magnification accuracy in the main scanning direction described below are performed under the control of the control unit 10.

[Adjustment of the Magnification Accuracy in the Main Scanning Direction]

Image data that includes the images of the pair of patterns 11 is inputted to the scaling factor calculation unit 15. The scaling factor calculation unit 15 performs the following operations, using the image data.

Specifically, the scaling factor calculation unit 15 calculates an image scaling factor for scaling, in the main scanning direction, a line sandwiched by a first two of the reference objects 11A represented by the image data, where the first two reference objects 11A oppose each other in the main scanning direction. This results in the actual interval (the interval in the main scanning direction between a second pair of opposing reference objects 11A drawn in the pair of patterns 11) being equal to the interval in the main scanning direction between the first two reference objects 11A.

In this case, the interval in the main scanning direction between two opposing reference objects 11A drawn in the pair of patterns 11 represents the interval between the first valley V formed by two triangles representing adjacent ones of the reference objects 11A in the sub-scanning direction and the second valley V opposing the first valley V in the main scanning direction.

The procedure for calculating an image scaling factor for scaling each line (a line A, a line B, a line C, . . . ) in the main scanning direction is as follows.

Figures 10A, 10B:
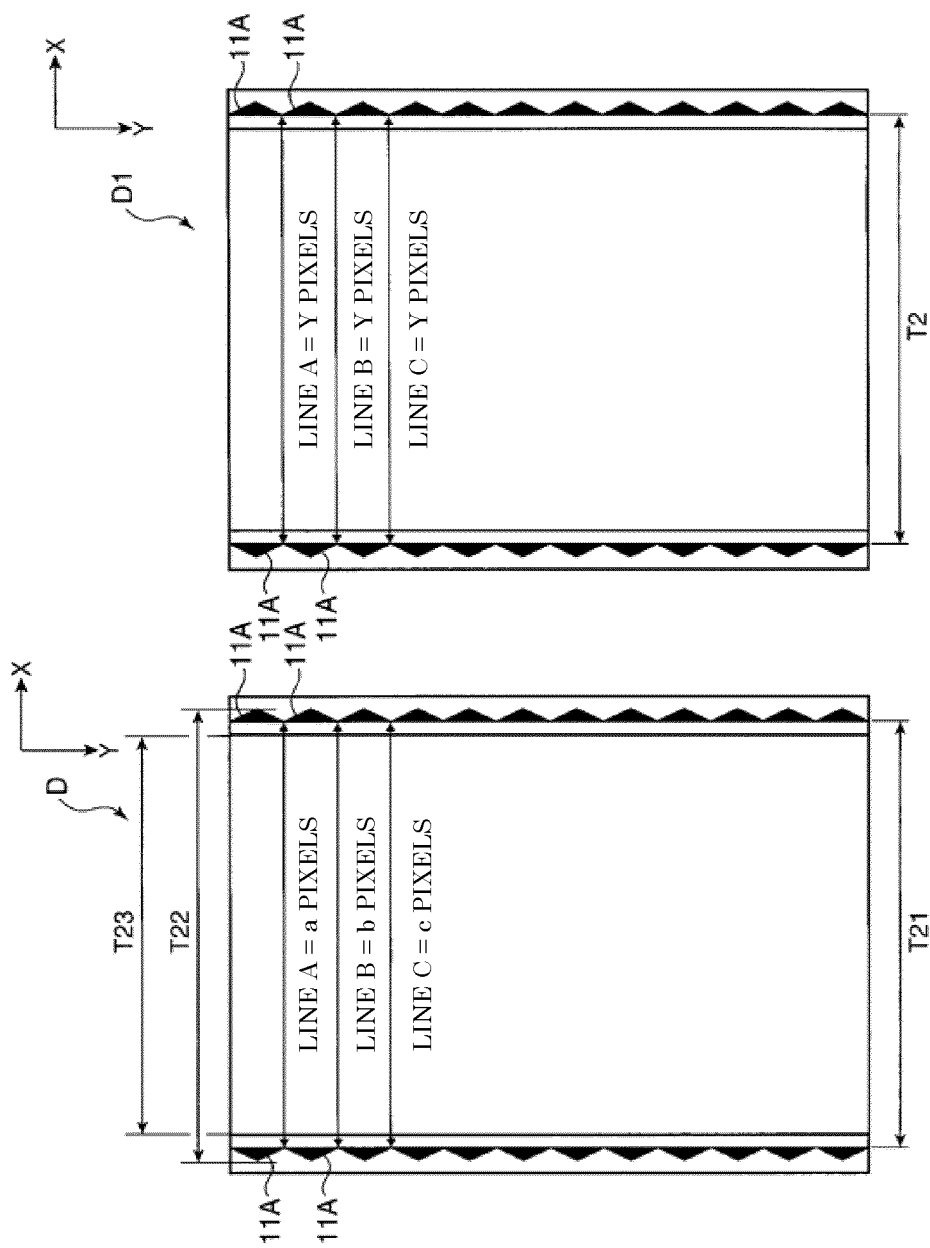
FIGS. 10A and 10B show the procedure for calculating an image scaling factor for scaling a line in the main scanning direction.

FIGS. 10A and 10B show the procedure for calculating an image scaling factor for scaling a line in the main scanning direction. FIG. 10A shows the image data having not been scaled in the main scanning direction and FIG. 10B shows the image data having been scaled in the main scanning direction, respectively.

[Procedure for Calculating Image Scaling Factor for Scaling in Main Scanning Direction]

The actual interval in the main scanning direction between two opposing reference objects 11A drawn in the patterns 11 is Y pixels. Pixel number Y is calculated from an interval T2 in the main scanning direction of the document mounting area 20B. Specifically, pixel number Y representing the actual interval in the main scanning direction between two of the reference objects 11A opposing each other in the main scanning direction is obtained by the scaling factor calculation unit 15 dividing the interval T2 by a predetermined actual size of a pixel.

When the image data D including the images of the pair of patterns 11 is inputted, the scaling factor calculation unit 15 detects, for each line, a point at which the density value of a corresponding one of the reference objects 11A changes from black to white. This point is in the valley V formed by adjacent ones of the reference objects 11A in the sub-scanning direction (in FIGS. 10A and 10B, the Y-axis direction).

Then, for each line (the line A, the line B, the line C, . . . ) sandwiched by the first valley V detected in the image data D and the second valley V opposing the first valley V in the main scanning direction (in FIGS. 10A and 10B, the X-axis direction), the scaling factor calculation unit 15 calculates an image scaling factor such that the interval in the main scanning direction between two of the reference objects 11A opposing each other in the main scanning direction is equal to the interval in the main scanning direction between opposing two of the reference objects 11A represented by the image data.

Specifically, when the number of pixels in the main scanning direction in the line A is "a", as shown in FIG. 10A, Y/a is calculated as an image scaling factor. Moreover, when the number of pixels in the main scanning direction in the line B is "b", Y/b is calculated as an image scaling factor. Moreover, when the number of pixels in the main scanning direction in the line C is "c", Y/c is calculated as an image scaling factor.

The image data D1 shown in FIG. 10B can be obtained by scaling the line A, the line B, and the line C in the main scanning direction according to the respective image scaling factors. In the image data D1, the number of pixels indicating the interval in the main scanning direction between opposing two of the reference objects 11A is Y in the line A, the line B, and the line C.

The image scaling factor calculated in this manner is stored in the scaling factor storage unit 16 for each line.

Figure 11:
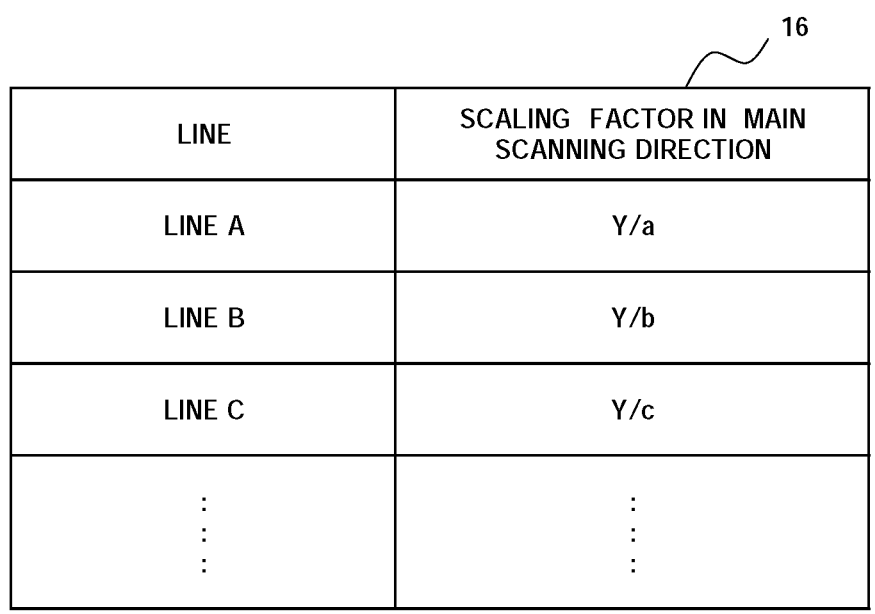
FIG. 11 shows how image scaling factors are stored in the scaling factor storage unit.

FIG. 11 shows how image scaling factors are stored in the scaling factor storage unit 16. In the scaling factor storage unit 16 shown in FIG. 11, the image scaling factor (in this case, set as "scaling factor in main scanning direction") is stored for each line (the line A, the line B, the line C, . . . ). Specifically, image scaling factor Y/a is stored for line A, image scaling factor Y/b is stored for line B, and image scaling factor Y/c is stored for line C.

Image scaling factors stored in the scaling factor storage unit 16 in this manner are used when adjusting the magnification accuracy in the main scanning direction, as described below.

[Adjustment of Magnification Accuracy in Main Scanning Direction]

When the image data of a document is generated by the CCD 12, the image processing unit 14 accepts input of the generated image data of the document.

In this case, the accepted image data of the document includes the image data of the patterns 11. Thus, the image processing unit 14 removes pixels corresponding to the pair of edges 20C of the document table (platen unit) 20 from the accepted image data of the document. Only the image data of the document is obtained by this operation.

When the image data of only the document is obtained in this manner, the image processing unit 14 reads the image scaling factor of each line (the line A, the line B, the line C, . . . ) from the scaling factor storage unit 16 shown in FIG. 11. Then, the image data of only the document is scaled for each line according to an image scaling factor corresponding to the line.

Specifically, out of the image data, line A is scaled by a factor of Y/a in the main scanning direction, line B is scaled by a factor of Y/b in the main scanning direction, and line C is scaled by a factor of Y/c in the main scanning direction. The magnification accuracy in the main scanning direction is improved by such adjustment.

Figure 12:
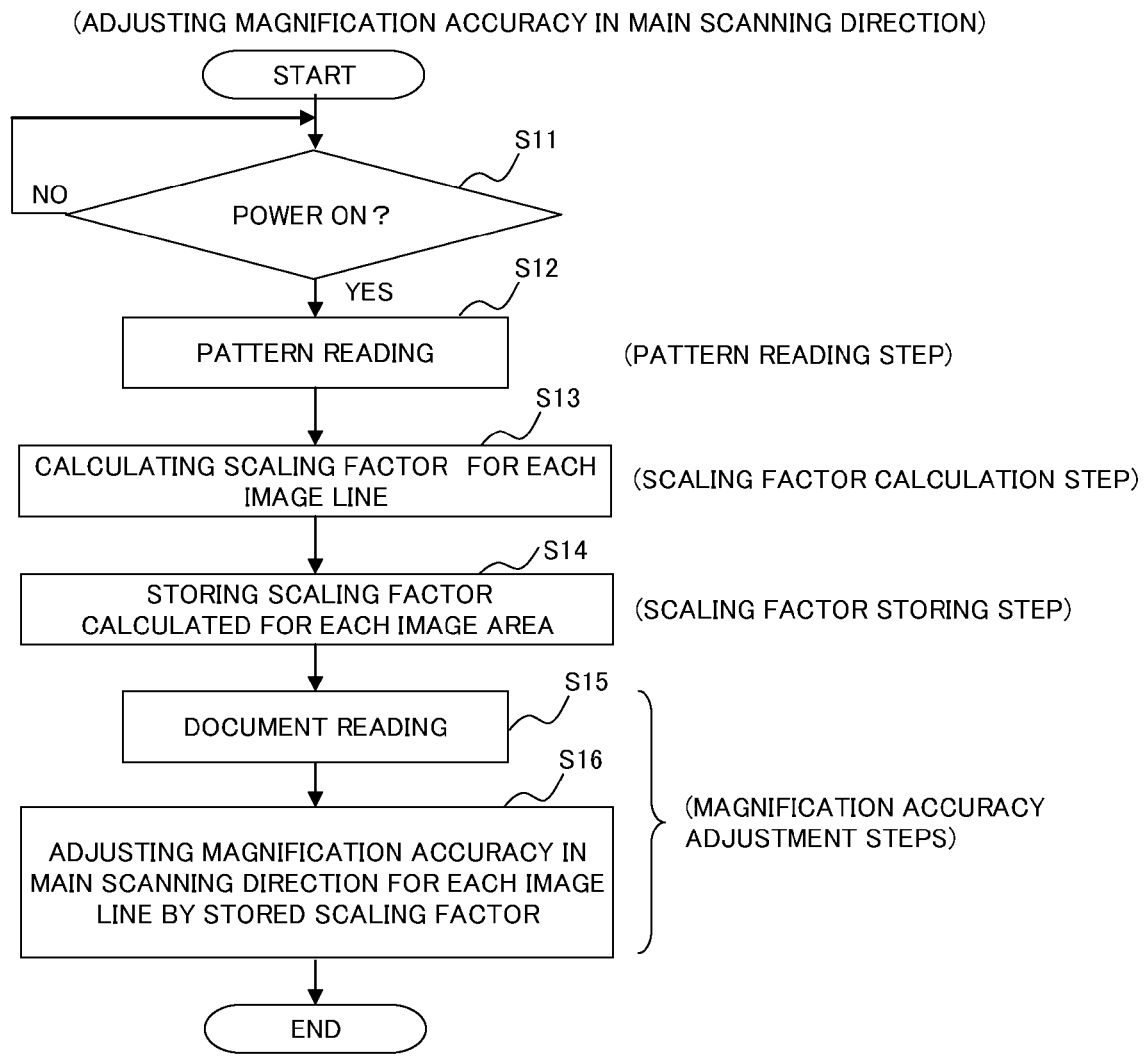
FIG. 12 is flowchart showing another exemplary method according to an embodiment of the present invention for adjusting the magnification accuracy.

FIG. 12 is flowchart showing an exemplary method according to an embodiment of the present invention for adjusting the magnification accuracy in the main scanning direction.

In the image reader 1, when it is determined in step S11 that the power has been turned on, in step S12 (a pattern reading step), the scanning unit 53 scans the patterns 11, and the CCD 12 generates the image data of the patterns 11.

Then, after a scaling factor calculation step and a scaling factor storage step (described below) are performed, the following magnification accuracy adjustment steps are performed.

Specifically, in step S13 (the scaling factor calculation step), for each line (line A, line B, line C, . . . ), the scaling factor calculation unit 15 calculates an image scaling factor such that the interval in the main scanning direction between a first two of the reference objects 11A drawn in the pair of patterns 11, the first two reference objects 11A opposing each other in the main scanning direction, is equal to the interval in the main scanning direction between a second two of the reference objects 11A represented by the image data, the second two reference objects 11A opposing each other in the main scanning direction.

Then, in step S14 (the scaling factor storage step), the scaling factor storage unit 16 stores the image scaling factor calculated for each line.

Then, when it is determined in step S15 that the image data of a document has been generated, in step S16, the control unit 10 causes the image processing unit 14 to scale the image data of the document in the main scanning direction for each line according to an image scaling factor stored in association with the line in the scaling factor storage unit 16. Such operations shown in steps S15 and S16 are called magnification accuracy adjustment steps.

Figure 13:
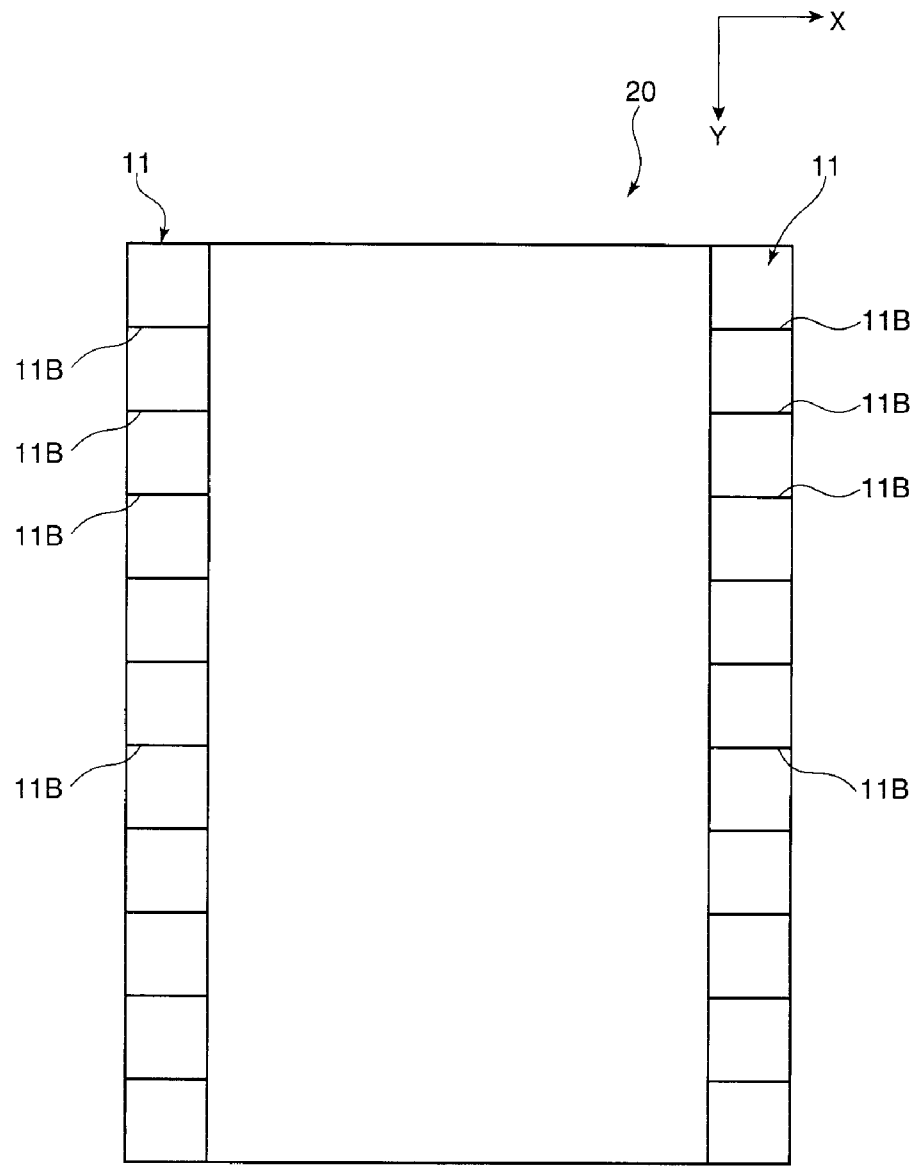
FIG. 13 shows another exemplary arrangement of a pair of patterns.

In this case, the image reader 1 can also perform the aforementioned adjustment of the magnification accuracy in the main scanning direction, using the pair of patterns 11, in which linear objects 11B are drawn as a reference image, as shown in FIG. 13.

Moreover, a first edge (a point at which the image is changed from white to black or a point at which the image is changed from black to white) of one of the linear objects 11B may be detected, and the interval between the first edge and a second edge opposing the first edge in the main scanning direction may be set as the interval in the main scanning direction between two of the linear objects 11B opposing each other in the main scanning direction.

Moreover, other figures may be used. For example, figures that have clear density difference with respect to a white image and are drawn so as to be directed in the main scanning direction may be used.

In the image reader 1 according to an embodiment of the present invention, since the magnification accuracy in the sub-scanning direction and the main scanning direction can be adjusted under the control of the control unit 10, as described above, operations of adjusting the mechanical precision in manufacturing or shipment are unnecessary, and thus the magnification accuracy can be adjusted at low cost.

What is claimed is:

1. An image reader having a main scanning direction and a sub-scanning direction perpendicular to the main scanning direction, comprising:
   a platen unit that includes a document area where a document is placed and a reference pattern area on an outer periphery of the document area, wherein the reference pattern area includes reference patterns drawn at predetermined intervals in the sub-scanning direction;
   a scanning unit that optically scans the document area and the reference pattern area while the scanning unit moves in the sub-scanning direction and forms an image on an imaging device via a lens, from which the imaging device generates an electrical signal;
   an image data generation unit that generates image data from the electrical signal generated by the imaging device and stores the image data in an image memory;
   a drive unit that reciprocates the scanning unit in the sub-scanning direction;
   an image processing unit that performs predetermined image processing on the image data stored in the image memory;
   a scaling factor calculation unit that calculates correction scaling factors for scaling a plurality of image areas in the sub-scanning direction, each image area being separated by the interval in the sub-scanning direction between adjacent ones of the reference patterns, so that the interval in the sub-scanning direction between adjacent ones of the reference patterns drawn in the reference pattern area is equal to the interval in the sub-scanning direction between adjacent ones of the reference patterns read by the image data;
   a scaling factor storage unit that stores the correction scaling factor for each image area; and
   a control unit that causes the image processing unit to scale the image data of the document in the sub-scanning direction for each image area according to the correction scaling factor stored in association with each respective image area in the scaling factor storage unit.

2. The image reader according to claim 1, wherein the control unit adjusts magnification accuracy in the sub-scanning direction by multiplying each image area of the read document image data by one of the correction scaling factors calculated by the scaling factor calculation unit, and that corresponds to the respective image area.

3. The image reader according to claim 1,
   wherein the platen unit includes a pair of groups of the reference patterns disposed on both sides of the document area,
   wherein the scaling factor calculation unit calculates correction scaling factors of the read images in the main scanning direction so that each interval in the main scanning direction between opposing reference patterns disposed on both sides of the document area is equal to each interval in the main scanning direction between opposing reference patterns read by the image data, and
   wherein the control unit adjusts magnification accuracy of the document image in the main scanning direction by multiplying read image data of the document by the correction scaling factors.

4. The image reader according to claim 1, further comprising:
   a scanning speed adjustment unit that adjusts movement speed of the scanning unit by using the drive unit,
   wherein, when a document is read, the scaling factor calculation unit calculates a correction scaling factor for each image area, and
   wherein the control unit uses the scanning speed adjustment unit to adjust magnification accuracy of a read image of the document by changing the movement speed of the scanning unit during each image area.

5. The image reader according to claim 1, wherein the scanning unit uses reflective mirrors to pass reflected light through the lens to the imaging device.

6. The image reader according to claim 1, wherein the magnification accuracy is adjusted while reading the image of the document.

7. The image reader according to claim 1, wherein the magnification accuracy is adjusted after reading the image of the document.

8. The image reader according to claim 1, wherein the image processing unit removes pixels corresponding to the reference patterns from the image data generated by the imaging device.

9. A method for adjusting magnification accuracy of an image reader, the method comprising the steps of:

reading by optically scanning reference patterns disposed on a platen unit that includes a document area where a document is placed and a reference pattern area on an outer periphery of the document area while a scanning unit moves in a sub-scanning direction, wherein the reference pattern area includes reference patterns drawn at the predetermined intervals in the sub-scanning direction, and storing the read images of the reference patterns as image data in an image memory;

calculating correction scaling factors for scaling a plurality of image areas in the sub-scanning direction, each image area being separated by the interval in the sub-scanning direction between adjacent ones of the reference patterns, so that the interval in the sub-scanning direction between adjacent ones of the reference patterns drawn in the reference pattern area is equal to the interval in the sub-scanning direction between adjacent ones of the reference patterns read by the image data;

reading a document placed on the platen unit by scanning while the scanning unit moves in a sub-scanning direction; and adjusting magnification accuracy of an image of the document by multiplying each image area of the image data of the read document by one of the correction scaling factors that corresponds to the respective image area.

10. The method according to claim 9, further comprising:

reading a pair of groups of reference patterns disposed on both sides of the document area on the platen unit;

calculating correction scaling factors of the read images in a main scanning direction so that each interval in the main scanning direction between opposing reference patterns disposed on both sides of the document area is equal to each of the interval in the main scanning direction between opposing reference patterns read by image data; and adjusting magnification accuracy in the main scanning direction using the correction scaling factors.

11. The method according to claim 10, wherein adjusting the magnification accuracy includes multiplying the image data by the correction scaling factors in the main scanning direction.

12. The method according to claim 9, further comprising removing pixels corresponding to the reference patterns from the image data of the read document.

13. A method for adjusting magnification accuracy of an image reader, the method comprising the steps of:

reading by optically scanning reference patterns disposed on a platen unit that includes a document area where a document is placed and a reference pattern area on an outer periphery of the document area while a scanning unit moves in a sub-scanning direction, wherein the reference pattern area includes reference patterns drawn at the predetermined intervals in the sub-scanning direction, and storing the reference patterns as pattern image data in an image memory;

calculating correction scaling factors for scaling a plurality of image areas in the sub-scanning direction, each image area being separated by the interval in the sub-scanning direction between adjacent ones of the reference patterns, so that the interval in the sub-scanning direction between adjacent ones of the reference patterns on an outer periphery of the document area is equal to the interval in the sub-scanning direction between adjacent ones of the reference patterns read by the image data; and reading an image of a document placed on the platen unit while changing read scanning speed of the scanning unit in the sub-scanning direction on the basis of the correction scaling factors for each image area.

14. The method according to claim 13, further comprising processing to remove pixels corresponding to the reference patterns from the image data of the document.

* * * * *